(12) United States Patent
Bansal et al.

(10) Patent No.: US 8,793,228 B2
(45) Date of Patent: Jul. 29, 2014

(54) FILE SYSTEM INCLUDING A FILE HEADER AREA AND A FILE DATA AREA

(75) Inventors: Vipin Bansal, Delhi (IN); Deepak Naik, New Delhi (IN); Raunaque Quaiser, Ghaziabad (IN); Alok Kumar Mittal, Delhi (IN)

(73) Assignee: STMicroelectronics PVT. Ltd., Greater Noida (IN)

( * ) Notice: Subject to any disclaimer, the term of this patent is extended or adjusted under 35 U.S.C. 154(b) by 792 days.

(21) Appl. No.: 12/353,563

(22) Filed: Jan. 14, 2009

(65) Prior Publication Data

US 2010/0185705 A1    Jul. 22, 2010

(51) Int. Cl.
  *G06F 7/00* (2006.01)
  *G06F 17/30* (2006.01)
  *G06F 12/00* (2006.01)
  *G06F 17/00* (2006.01)

(52) U.S. Cl.
  USPC ............................ 707/693; 707/822; 707/830

(58) Field of Classification Search
  USPC ............ 707/822, 830, 999.001–999.005, 693
  See application file for complete search history.

(56) References Cited

U.S. PATENT DOCUMENTS

| 5,053,945 | A | * | 10/1991 | Whisler | 707/999.2 |
| 5,170,479 | A | * | 12/1992 | Takamoro | 707/999.003 |
| 5,276,874 | A | * | 1/1994 | Thomson | 707/999.2 |
| 5,652,865 | A | * | 7/1997 | Rawlings, III | 707/999.101 |
| 5,850,566 | A | * | 12/1998 | Solan et al. | 710/5 |
| 6,088,777 | A | * | 7/2000 | Sorber | 711/171 |
| 6,615,224 | B1 | * | 9/2003 | Davis | 707/610 |
| 6,895,486 | B2 | * | 5/2005 | Wong et al. | 711/173 |
| 2001/0042240 | A1 | * | 11/2001 | Ng et al. | 717/3 |
| 2002/0065823 | A1 | * | 5/2002 | Boulter et al. | 707/7 |
| 2003/0002665 | A1 | * | 1/2003 | Sako et al. | 380/37 |
| 2006/0179083 | A1 | * | 8/2006 | Kulkarni et al. | 707/204 |
| 2008/0270722 | A1 | * | 10/2008 | Liu et al. | 711/162 |

* cited by examiner

*Primary Examiner* — Kannan Shanmugasundaram
(74) *Attorney, Agent, or Firm* — Allen, Dyer, Doppelt, Milbrath & Gilchrist, P.A.

(57) ABSTRACT

A system includes a storage subsystem having a data area and a header area. The data area is for storing contents of at least one data file, and the header area is for storing access parameters and status information for accessing each data file individually. The data area and the header area define a storage area in the storage subsystem. Multiple files are efficiently managed based on utilization of the storage area in the storage subsystem.

12 Claims, 7 Drawing Sheets

FILE SYSTEM INCLUDING A FILE HEADER AREA AND A FILE DATA AREA

FIELD OF THE INVENTION

The present invention relates to memory devices, and more particularly, to a file system used in memory devices.

BACKGROUND OF THE INVENTION

Several different file systems may be used for storing data in memory devices. One such file system is the "lightweight" file system in which each memory sector contains a header to indicate the status of the sector and multiple data records, each with its own header. This flash file system requires implementation of a compacting operation in order to retrieve the space occupied by deleted files. This file system uses a linked list structure in which the data and header share space together.

Another file system known as the "tiny flash file system" organizes the files within the flash in a contiguous one-way linked list with the data and header sharing space together. In this file system, the deleted files space is also available for use only after defragmentation has been performed. There is also the need for a boot monitor that occupies the memory space.

SUMMARY OF THE INVENTION

In view of the foregoing background, it is therefore an object of the present invention to provide a more efficient way to store data in a memory device.

This and other objects, features, and advantages in accordance with the present invention are provided by a system comprising a storage subsystem comprising a data area for storing contents of at least one data file, and a header area for storing access parameters and status information for accessing each data file individually. The storage subsystem is a memory device, for example.

The header area may comprise a global area for storing global storage subsystem parameters, and individual file headers. The global storage subsystem parameters may comprise at least one of file occupancy parameters, data file storage area size parameters, and data validity check parameters.

The data area and the header area may define a storage area. The data area may have an origin at a first storage location of the storage area and extends towards a last available storage location of the storage area. Similarly, the header area may have an origin at a last storage location of the storage area and extends towards a first available storage location of the storage area.

Another aspect is directed to a method of storing data in a storage subsystem comprising storing contents of at least one data file in a data area, and storing file information and status information in a header area for accessing each file individually.

Storing the individual file parameters may comprise merging file headers for individual deleted files when the individual deleted files occupy contiguous data areas. The method may further comprise updating the header area based on the corresponding data area being modified. The method may further comprise determining a number of stored files and available space in the corresponding data area based on updated status and access information available in the header area without accessing the data area.

BRIEF DESCRIPTION OF THE DRAWINGS

The disclosure is illustrated with the help of the accompanying drawings, wherein.

DETAILED DESCRIPTION OF THE PREFERRED EMBODIMENTS

Figure 1:
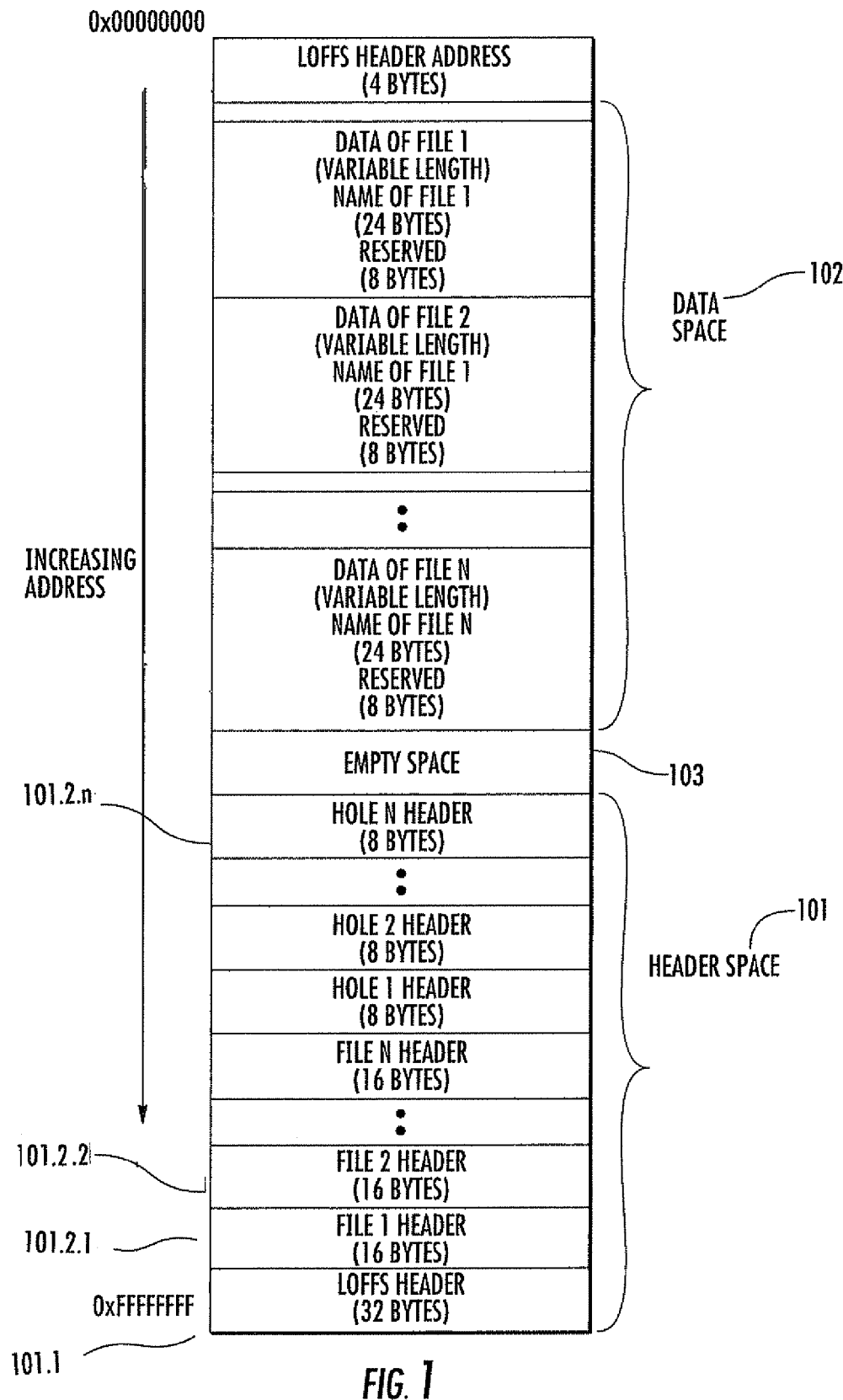
FIG. 1 illustrates the structure of a file system according to an embodiment of the present invention.

Some embodiments of the present invention are described in detail with reference to the accompanying drawings. However, the present invention is not limited to these embodiments that are provided to aid in the understanding of one of ordinary skill in the relevant art. In the accompanying drawings, like reference numerals are used to indicate like components.

The terms memory and storage subsystem imply the same meaning, and have been used interchangeably. As will be discussed in greater below, a file system manages multiple files in a storage subsystem by optimum utilization of the area of the storage subsystem. A system comprising such a subsystem may include a data area and a header area. The data area stores contents of one or more data files while the header area stores access parameters and status information for accessing each file individually.

The header area further includes a global area for storing global storage subsystem parameters necessary for initialization. These parameters may include information on file occupancy, data file storage area size, and data validity check. The header area also comprises individual file headers for each file.

The origin of the data area is the first location of the storage area. The first location dynamically extends towards the last available storage location while the origin of the header area is the last location of the storage area. The second location dynamically extends towards the first available storage location.

All file headers (valid and deleted) are stored together to reduce overhead and enable faster access. Headers corresponding to deleted files having contiguous data areas are merged together to utilize memory more efficiently.

The structure of a file system is described in FIG. 1. It comprises a header area (101), a data area (102) and an empty area (103). The header area (101), which starts from the end of the memory area and extends towards the start of memory area, includes a global area (called an LOFFS header) (101.1), individual file headers (101.2.1, 101.2.2, . . . , 101.2.*n*) corresponding to each undeleted file in the memory area, and individual file headers (101.3.1, 101.3.2, . . . , 101.3.*n*) corresponding to each deleted file (referred to hereafter as a hole) in the memory area. The data area (102) contains data of all files, and starts from the start of the memory area and extends towards the end of memory area.

The empty area (103) corresponds to the space present between the data segment area and the header area (101).

Figure 2:
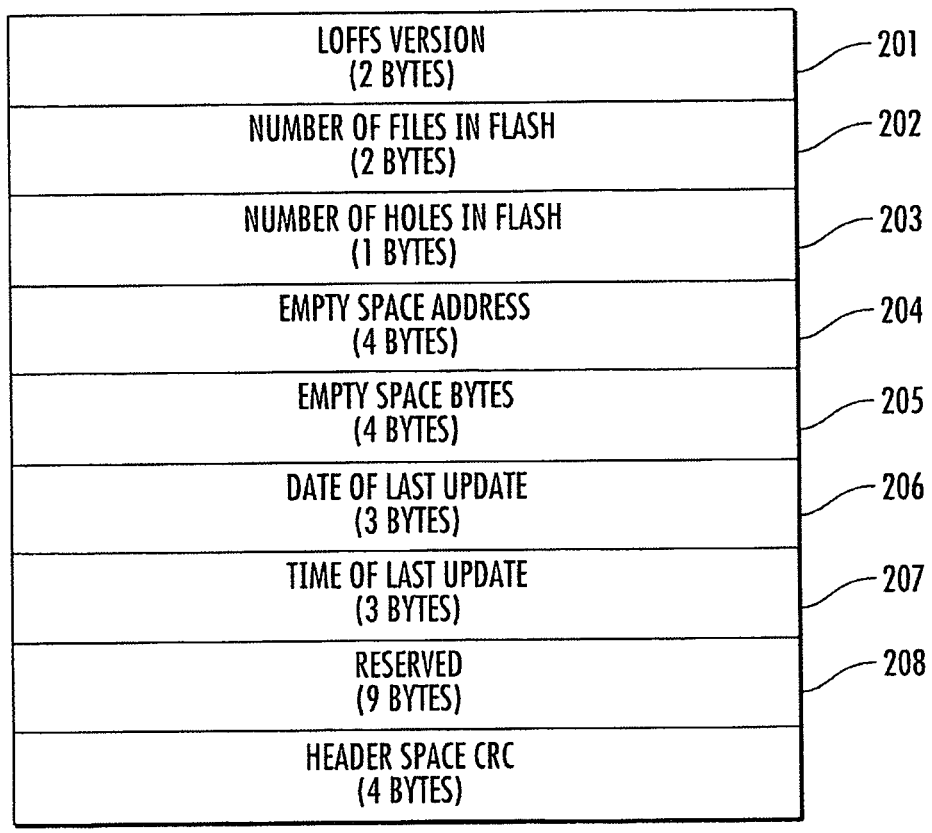
FIG. 2 illustrates the structure of a global area (also referred to as LOFFS) of the file system according to an embodiment of the present invention.

The global area (201) is also referred to as the LOFFS of the file system, as shown in FIG. 2. It shows a single header common to all the valid files as well as the deleted files (holes) present in the system. This header contains global storage subsystem parameters, such as the number of undeleted files, the number of holes in the storage subsystem, and the address and number of bytes in the empty space region. It also contains data validity check bytes (e.g., cyclic redundancy check (CRC) bytes) to validate the data in the common (LOFFS) header. The detailed structure of the global area 101.1 according to an embodiment is shown in FIG. 2.

The first field (201) contains the version information of the file system. The second field (202) contains the number of valid files and the third field (203) contains the number of holes. The fourth field (204) defines the start address of the empty space area. The fifth field (205) contains the number of bytes in the empty space area. This makes it possible to easily determine whether a new file will fit in the available empty space before storing any data. The sixth field (206) stores the date of the last update of the header space, in a predefined format. The seventh field (207) stores the time of the last update of the header space, in a predefined format. The data validity check field (208) is used to check for any corruption in the file system. This data validity check field is updated every time the global area, i.e., LOFFS is updated. Also, during initialization, i.e., booting up the data, validity check bytes are calculated and compared with the saved data validity check bytes. A match with the saved value ensures uncorrupted data.

Figure 3:
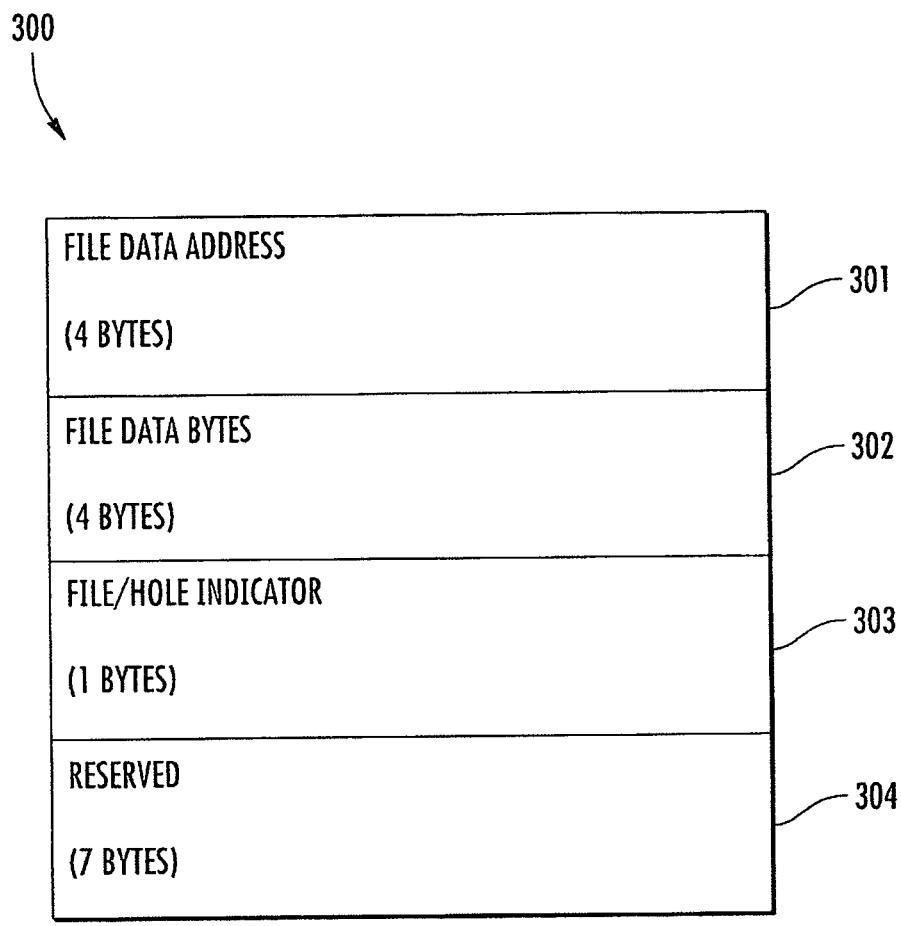
FIG. 3 illustrates the structure of a file header of an existing file or a new file to be added in the storage subsystem in accordance with an embodiment of the present invention.

FIG. 3 depicts the structure of a file header (300) pertaining to a particular file in accordance with the illustrated embodiment. Addition of new file or data adds a new file header in the file header area. This header contains file information, such as the starting address of the file data, the number of bytes in the file data, and an indicator of whether the file is valid or deleted. The file header comprises the following fields:

File data address field (301) contains the address of the start location of the file data in the memory area.

File data bytes (302) defines the number of bytes saved in the data area for that file. This count includes the collective length of data, data file name and reserved bytes.

File/hole indicator flag (303) defines whether the file is valid or is a hole (i.e., deleted file). One state indicates a valid file, while the other state represents a hole.

Deletion of a file converts the file header into a hole header by changing the state of the file/hole indicator flag (303) and swapping it with the header of latest added file. In one embodiment, the data areas corresponding to two or more contiguous holes are merged together to form a single hole. Reserved bytes (304) are provided for customization and future releases.

Figure 4:
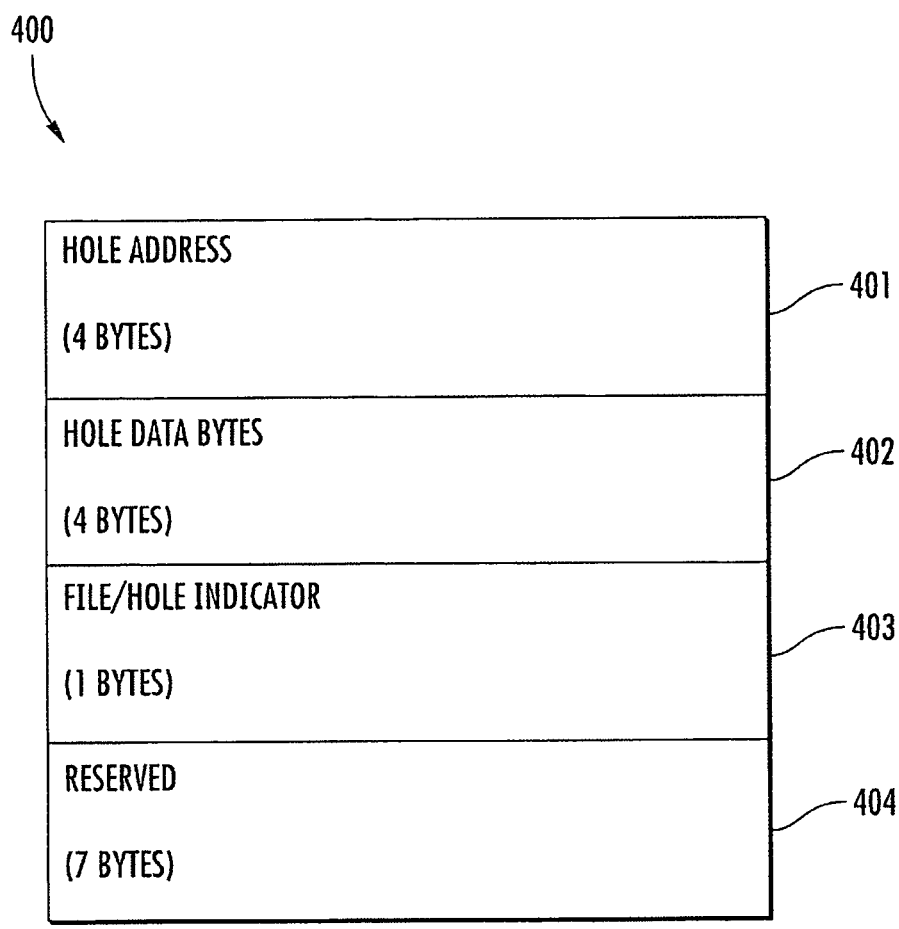
FIG. 4 illustrates the structure of a deleted file header present in the deleted file header area of the file system according to an embodiment of the present invention.

FIG. 4 depicts the structure of a deleted file header (400) pertaining to a particular deleted file in accordance with the illustrated embodiment. The deleted file header includes a hole address field (401) which corresponds to the address of the location where deleted file data is present. A hole data bytes field (402) corresponds to the size of the hole in bytes. The deleted file header further includes file/hole indicator (403), which differentiates between a file header and a hole header. One state indicates a valid file, while the other represents a hole. Reserved bytes (404) are provided for customization and future releases.

Figure 5:
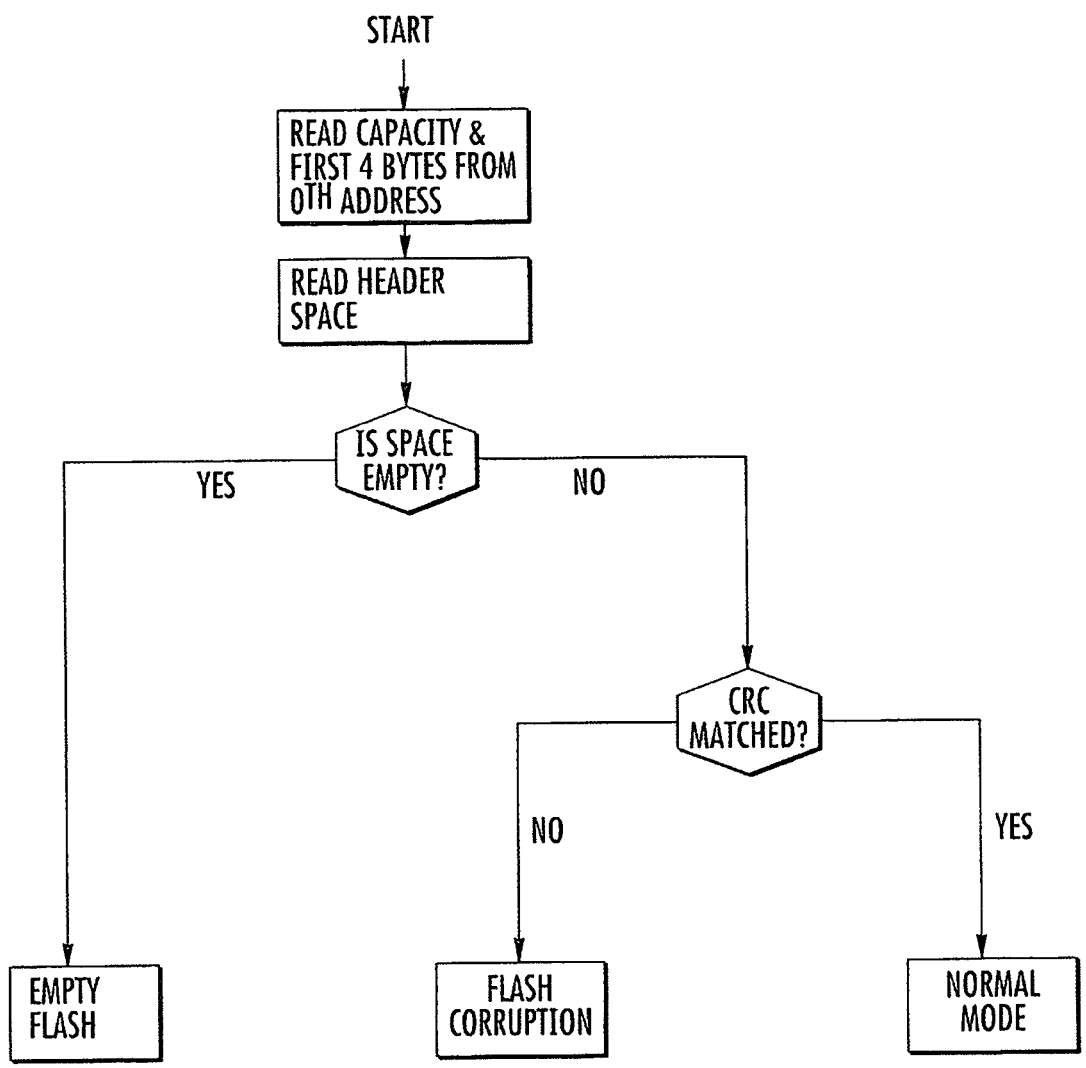
FIG. 5 is a flow diagram illustrating initialization in accordance with an embodiment of the present invention.

The initialization, i.e., a booting function, according to the illustrated embodiment is shown in FIG. 5 with the help of a flow diagram representation. On power-up (booting), information such as number of files, number of holes, consumed space, and remaining space in the storage subsystem, i.e., the memory area, is required. This information is available from the common (LOFFS) header whose address is saved at location 0x00 of the storage subsystem, i.e., the memory. At the time of initialization, the storage subsystem is in any of the following states:

Empty memory: in this state, all the bytes are in a default state. Hence, all the bytes in common (LOFFS) are in a default state.

Memory with valid data: in this state, valid data is present in the memory which is confirmed by matching the saved data validity check bytes with the new value which is calculated during booting.

Corrupted memory: in this state, memory is corrupted which can be due to any of the following two reasons: bits corruption due to ageing of the memory, which is rare; and a power failure during updating the memory contents.

Figure 6:
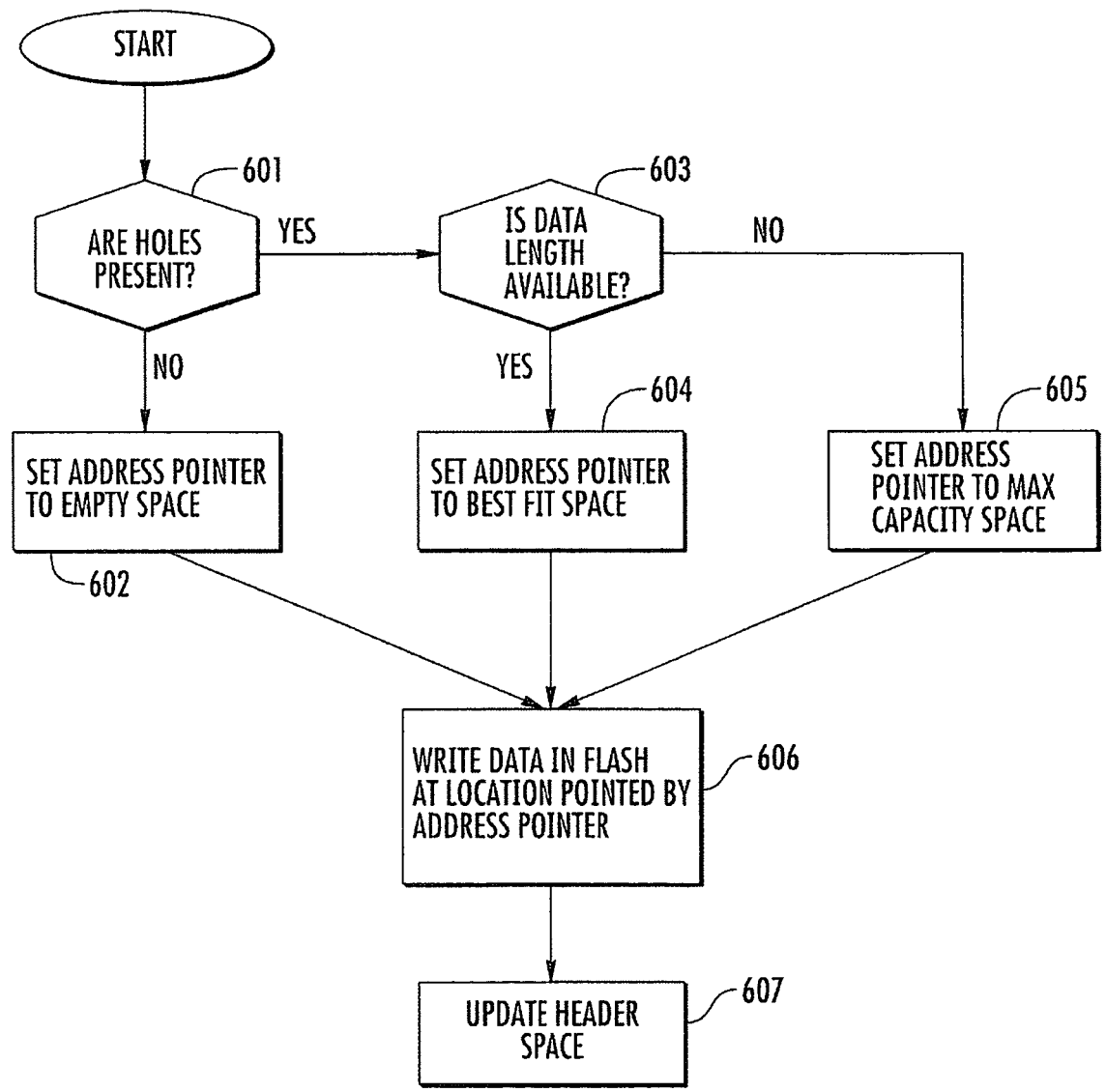
FIG. 6 is a flow diagram illustrating addition of a new file into the file system in accordance with an embodiment of the present invention.

FIG. 6 is a flow diagram illustrating addition of a new file in the storage subsystem according to the illustrated embodiment. This process involves pointing to an available set of empty locations in the memory large enough to hold the file data, followed by a data write operation and finally a header update operation. Before adding a new file, the memory is in any of the following states: empty Memory—memory with data but no holes; or memory with data and holes.

In all cases mentioned above, the data is first saved in the memory in an appropriate space followed by updating the header. In case 1 and case 2, i.e., for an empty memory and a memory with data but no holes, the data is stored in the empty space and the header space is then updated. This involves creation of a new header for that file and appending it after the header of the last saved file.

In case 3 of the memory with data and holes, one or more holes in the memory may be utilized to store the data. If the file data length is known in advance, a suitable algorithm (e.g., best fit) is used to determine the place for writing the data. If the size is not available in advance, then the data is written at the location having the maximum available space.

The first step (601) of the process determines whether or not one or more holes are present in the memory. In the absence of any holes, the address pointer is set to the beginning of the empty space in step (602). On the other hand, if holes are present, then the availability of the new file data length is determined in step (603).

If the data length is known, the address pointer is set at the beginning of the location that is found by a suitable algorithm (e.g., best fit) in step 604. If the data length is not known, then the address pointer is set to the beginning of the maximum capacity space available in the storage subsystem in step 605. In step 606, the data is saved in the storage subsystem at the location pointed by the address pointer. Finally, the header area is updated in step 607.

Figure 7:
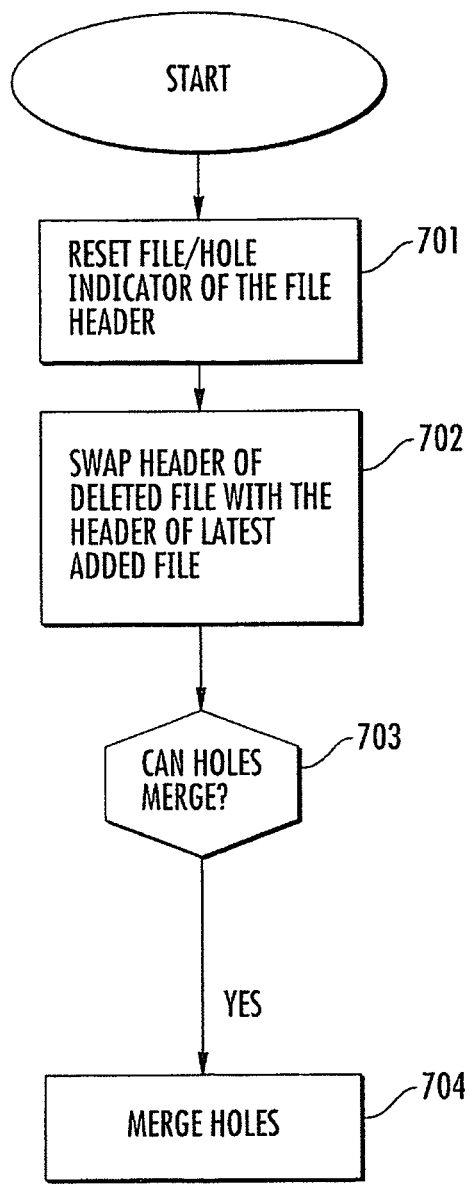
FIG. 7 is a flow diagram illustrating deletion of a file from the file system in accordance with an embodiment of the present invention.

FIG. 7 shows the flow diagram illustrating deletion of a file from the storage subsystem according to the illustrated embodiment. This is done by updating the header area without disturbing the data space. The flag/hole indicator of the file to be deleted is changed to indicate that it is now a hole in step 701. The modified header is swapped with the header of latest added file in step 702. The possibility of merging two or more holes pointing to contiguous data sections in step 703 is determined. In step 704 these headers are merged to form a single space for utilizing space efficiently.

Although the disclosure of the flash file system has been described in connection with various embodiments, the disclosure is not limited thereto. It will be apparent to those skilled in the art that various substitutions, modifications and changes may be made thereto without departing from the scope and spirit of the disclosure.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
a storage subsystem configured as a memory and comprising
a data area for storing contents of at least one data file, and
a header area for storing access parameters and status information for accessing each data file individually,
said data and header areas defining a storage area that includes an empty space area separating the data and header areas, with said data area having an origin at a first available storage location of the storage area and extending towards the empty space area and a last available storage location of the storage area, and with said header area having an origin at the last available storage location of the storage area and extending towards the empty space area and the first available storage location of the storage area, said header area comprising a single common global area common to all the valid files as well as to deleted files, with the deleted files corresponding to holes, and with the single common global area for storing global storage subsystem parameters comprising a number of undeleted files, a number of holes in the storage area, and an address and number of bytes in the empty space area.

2. The system according to claim 1, wherein the global storage subsystem parameters further comprise individual file headers.

3. The system according to claim 2, wherein the global storage subsystem parameters further comprise at least one of file occupancy parameters and data validity check parameters.

4. A memory comprising:
a data area for storing contents of at least one data file; and
a header area for storing file information and status information for accessing each file individually,
said data and header areas defining a storage area that includes an empty space area separating the data and header areas, with said data area having an origin at a first available storage location of the storage area and extending towards the empty space area and a last available storage location of the storage area, and with said header area having an origin at the last available storage location of the storage area and extending towards the empty space area and the first available storage location of the storage area,
said header area comprising a single common global area common to all the valid files as well as to deleted files, with the deleted files corresponding to holes, and with the single common global area for storing global storage subsystem parameters comprising a number of undeleted files, a number of holes in the storage area, and an address and number of bytes in the empty space area.

5. The memory device according to claim 4, wherein the global memory device parameters further comprise individual file headers.

6. The memory device according to claim 5, wherein the global storage subsystem parameters further comprise at least one of file occupancy parameters and data validity check parameters.

7. A method of storing data in a storage subsystem comprising a data area and a header area, the method comprising:
storing contents of at least one data file in the data area; and
storing file information and status information in the header area for accessing each file individually;
said data and header areas defining a storage area that includes an empty space area separating the data and header areas,
with the data area having an origin at a first available storage location of the storage area and extending towards the empty space area and a last available storage location of the storage area, and with the header area having an origin at the last available storage location of the storage area and extending towards the empty space area and the first available storage location of the storage area,
with the header area comprising a single common global area common to all the valid files as well as to deleted files, with the deleted files corresponding to holes, and with the single common global area for storing global storage subsystem parameters comprising a number of undeleted files, a number of holes in the storage area, and an address and number of bytes in the empty space area.

8. The method according to claim 7, wherein the global memory device parameters further comprise individual file headers.

9. The method according to claim 8, wherein the global storage subsystem parameters further comprise at least one of file occupancy parameters and data validity check parameters.

10. The method according to claim 7, wherein storing individual file parameters comprises merging file headers for individual deleted files when the individual deleted files occupy contiguous data areas.

11. The method according to claim 7, further comprising updating the header area based on the corresponding data area being modified.

12. The method according to claim 7, further comprising determining a number of stored files and available space in the corresponding data area based on updated status and access information available in the header area without accessing the data area.

* * * * *

UNITED STATES PATENT AND TRADEMARK OFFICE
CERTIFICATE OF CORRECTION

| | | |
|---|---|---|
| PATENT NO. | : 8,793,228 B2 | |
| APPLICATION NO. | : 12/353563 | |
| DATED | : July 29, 2014 | |
| INVENTOR(S) | : Bansal et al. | |

It is certified that error appears in the above-identified patent and that said Letters Patent is hereby corrected as shown below:

In the claims

Column 6, Line 8  Delete: "device according"
Claim 5  Insert: --according--

Column 6, Line 11  Delete: "device according"
Claim 6  Insert: --according--

Signed and Sealed this
Twenty-ninth Day of March, 2016

Michelle K. Lee
*Director of the United States Patent and Trademark Office*